April 15, 1969

H. F. BOUDIN 3,439,326

VEHICLE EMERGENCY SIGNAL LIGHT

Filed Jan. 20, 1967

INVENTOR.
HENRY F. BOUDIN,
BY
Berman, Davidson & Berman
ATTORNEYS.

April 15, 1969
H. F. BOUDIN
3,439,326
VEHICLE EMERGENCY SIGNAL LIGHT
Filed Jan. 20, 1967
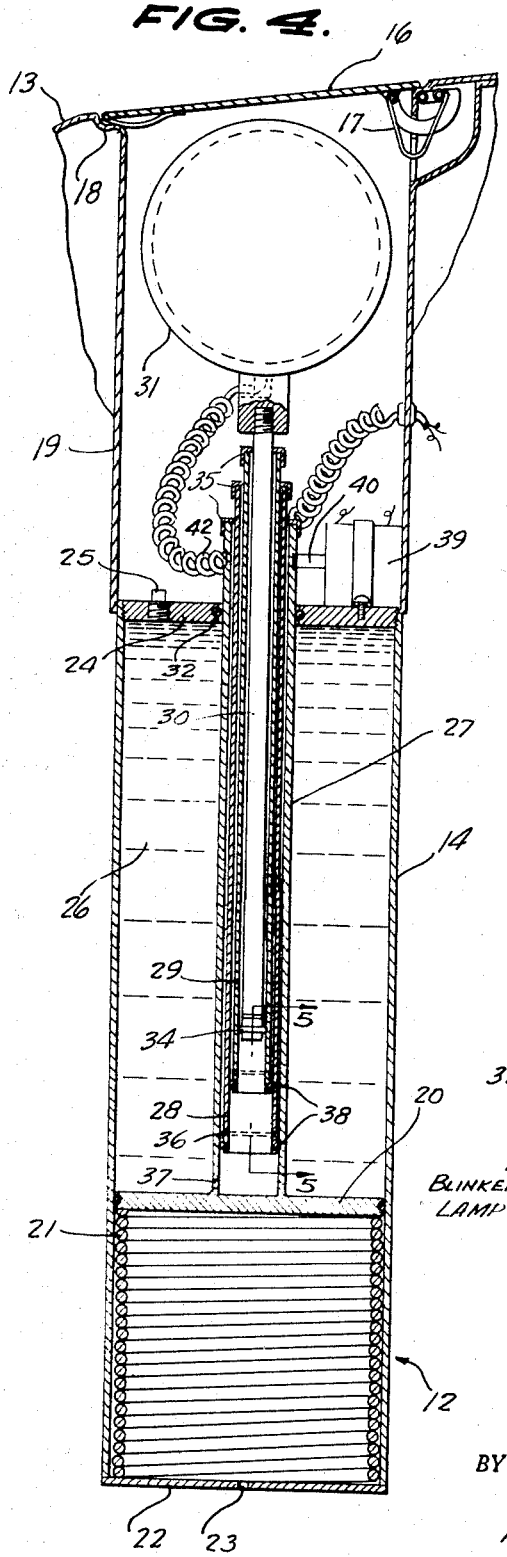
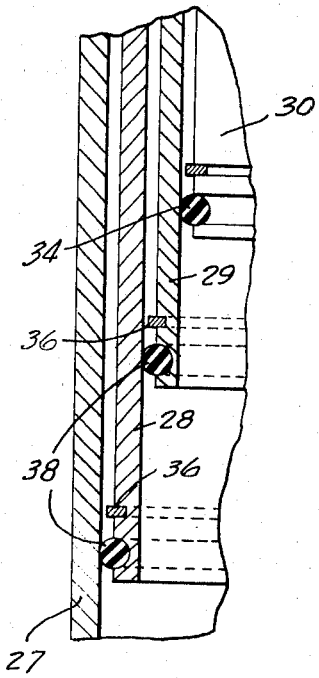
INVENTOR.
HENRY F. BOUDIN,
BY
Berman, Davidson & Berman
ATTORNEYS.

United States Patent Office 3,439,326
Patented Apr. 15, 1969

3,439,326
VEHICLE EMERGENCY SIGNAL LIGHT
Henry F. Boudin, 165 Van's Lane,
New Sarpy, La. 70078
Filed Jan. 20, 1967, Ser. No. 610,513
Int. Cl. B60g *1/00;* E01f *9/00;* G08b *5/06*
U.S. Cl. 340—87    8 Claims

ABSTRACT OF THE DISCLOSURE

A vehicle warning light assembly of the "pop-up" type comprising a vertical housing containing hydraulic liquid and a piston having a hollow telescopic rod portion to the top end of which a signal light is connected, with a coil spring in the bottom of the housing acting upwardly on the piston with the piston rod having an aperture through which the hydraulic liquid can enter and urge the telescopic segments upwardly under the force of the coil spring when the spring is released. The telescopic piston rod is normally retained in a retracted position in the housing by locking engagement with the end of the plunger of a release solenoid which is connected in parallel with a branch circuit including the signal lamp and a blinker switch, these being connected to the vehicle battery through a manually-operated control switch. When the control switch is closed the release solenoid is energized, allowing the coil spring to expand and elevate the light, at the same time, energizing the light through the blinker switch.

---

This invention relates to vehicle warning lights, and more particularly to a warning light assembly of the "pop-up" type adapted to be mounted on a suitable portion of a vehicle body and to be normally housed in the body, but being elevated to a conspicuous visible position when energized.

A main object of the invention is to provide a novel and improved vehicle emergency signal light assembly which is simple in construction, which is relatively easy to install, and which is reliable in operation.

A further object of the invention is to provide an improved vehicle emergency signal light assembly which is inexpensive to manufacture, which is durable in construction, which requires a minimum amount of maintenance, which is normally mounted on the vehicle and is completely inconspicuous, and which is automatically elevated to a highly visible extended position when energized.

Further objects and advantages of the invention will become apparent from the following description and claims, and from the accompanying drawings, wherein:

FIGURE 4 is an enlarged vertical cross-sectional view taken axially through the vehicle emergency signal light assembly, said view being taken substantially on the line 4—4 of FIGURE 2.

FIGURE 5 is an enlarged fragmentary detail cross-sectional view taken substantially on the line 5—5 of FIGURE 4.

FIGURE 6 is a wiring diagram showing the electrical connections of the elements of the emergency signal light assembly of FIGURES 1 to 5.

Figure 1:
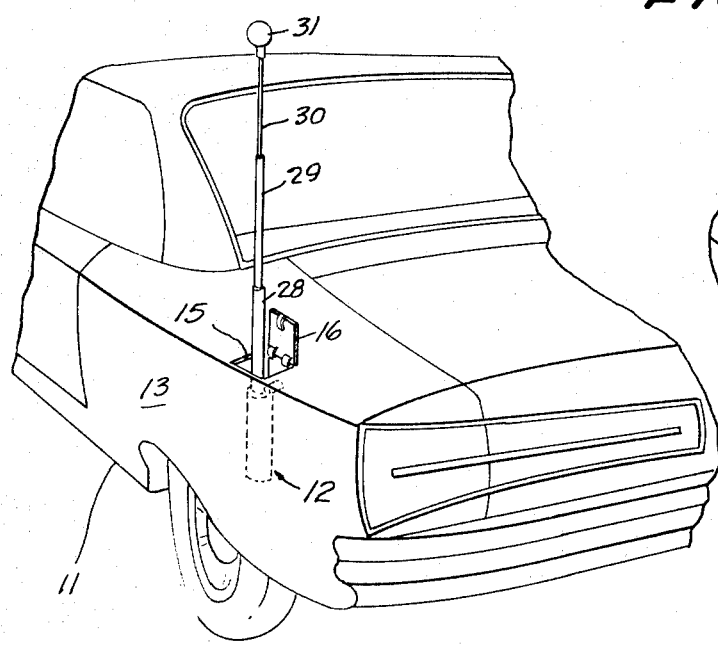
FIGURE 1 is a fragmentary perspective view of a portion of a vehicle body equipped with an improved emergency signal light assembly constructed in accordance with the present invention, the signal light being shown in extended operating position.
Figure 2:
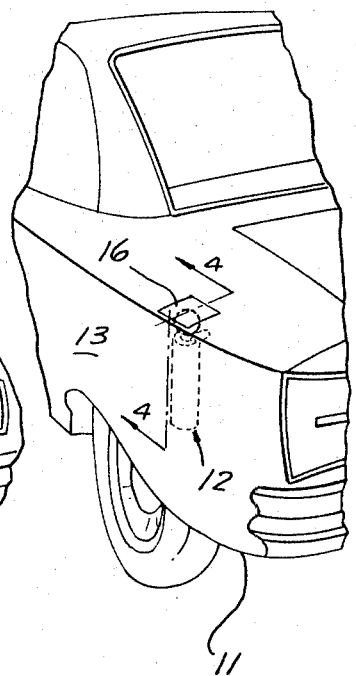
FIGURE 2 is a fragmentary perspective view similar to FIGURE 1, but showing the assembly retracted and housed in the vehicle body in its normal non-operating condition.

Referring to the drawings, 11 designates a conventional vehicle body and 12 generally designates an improved emergency signal light assembly according to the present invention installed in the rear left fender 13 of the vehicle body 11. As will be readily understood, the emergency signal light assembly may be installed in any suitable part of the vehicle body and is not limited to the specific location illustrated in the drawings, which is merely one typical example of the installation of the present invention.

The signal assembly 12 comprises a substantially vertically-arranged main housing 14 of generally cylindrical shape which is rigidly-secured at its top end to the periphery of an aperture 15 provided in the top wall of the fender 13, said aperture being provided with a hinged cover 16 which is normally held down in substantially flush relationship to the top wall of the fender by a suitable biasing spring 17. The cover 16 is thus yieldably held down in closed position with its rim in engagement with a suitable seat 18 provided therefor in the margin of the opening 15, as shown in FIGURE 4. The cover 16 is readily yieldable responsive to an upward force exerted thereon from below, as will be presently explained, so that it can be elevated to the open position thereof shown in FIGURE 1. The spring arrangement associated with the cover 16 is similar to that employed, for example, with the covers associated with the recesses containing vehicle gasoline tank caps, the covers being movable to upright positions to provide access to the gasoline tank caps, when desired.

The housing 14, above-mentioned, is generally cylindrical in shape and is suitably-secured to the bottom portion of a sleeve 19 which may be integrally or otherwise rigidly-connected to the margin of the aperture 15, whereby the sleeve 19 and the housing 14 form a single rigid unit.

Slidably and sealingly-positioned in the cylindrical housing 14 is a piston 20 which is biased upwardly by a normally compressed coiled spring 21 disposed between the piston 20 and the bottom wall 22 of housing 14, the bottom wall 22 being provided with a central vent aperture 23 providing exposure of the space beneath piston 20 to atmosphere. The housing 14 has the internal upper wall 24 which is provided with a filler plug 25. The housing 14 is filled with hydraulic liquid 26, such as oil or the like.

Rigidly-secured centrally to the piston 20 is the upright tubular sleeve 27, forming the outermost portion of a telescopic, extensible signal lamp post, as will be presently described. Concentrically-disposed in the sleeve 27 are additional telescopic segments 28 and 29, the inner telescopic segment 29 containing the central rod 30 to the top end of which is secured a conventional blinker lamp 31. The outer sleeve member 27 extends slidably and sealingly through a central aperture provided therefor in the cylinder top wall 24, a suitable sealing gasket, such as a sealing ring 32 being provided in the aperture, making sealing and sliding contact with sleeve 27. The telescoping sleeve 28 is similarly slidably and sealingly-engaged in sleeve 27 and the next innermost sleeve 29 is similarly slidably and sealingly-engaged in the sleeve 28. The rod 30 is provided at its lower end with a similar sealing ring 34 which makes sealing and sliding contact inside the innermost telescoping sleeve 29. The top ends of the sleeves 27, 28 and 29 are provided with stop rings 35 and the lower end portions of the sleeves 28 and 29 and the rod 30 are respectively provided with outwardly-projecting abutment collars or rings 36 engageable with the stop rings 35 to limit the upward extension of the respective telescoping elements to substantially the fully-extended positions thereof shown in FIGURE 1.

The outer sleeve element 27 is provided at its lower end portion with an aperture 37 allowing the hydraulic fluid 26 to freely enter the space inside the telescoping sleeve elements below their sealing rings 38 and the space beneath the rod 30 below its sealing ring 34.

Figure 3:
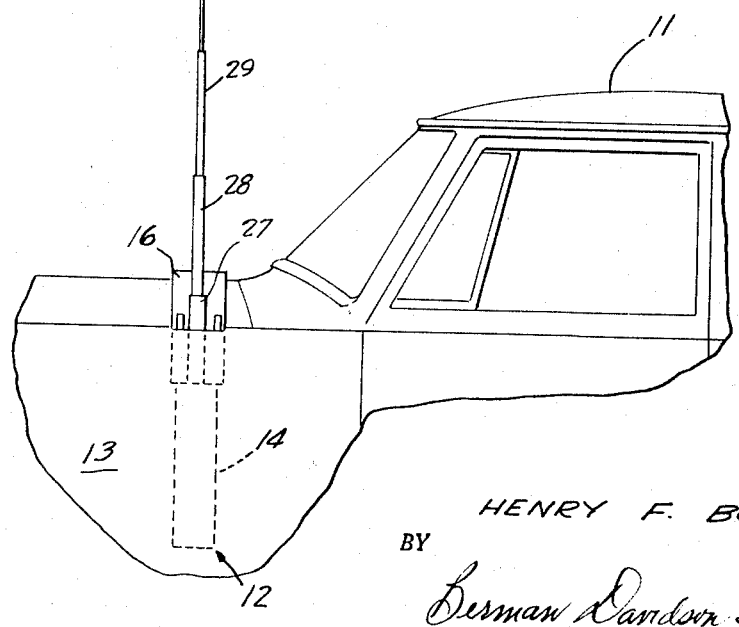
FIGURE 3 is a side elevational view of the structure shown in FIGURE 1.

Mounted on top wall 24 is a solenoid 39 having a plunger 40, the outer end of the plunger 40 being lockingly engageable in an annular locking groove 42 formed in the top end portion of sleeve 27. The solenoid 39 is provided with suitable biasing means urging the plunger 40 outwardly into locking engagement in ring 42, whereby to normally maintain the piston 20 in its depressed position, shown in FIGURE 4, with the spring 21 substantially fully compressed therebeneath. When the solenoid 39 is energized, the plunger 40 is retracted, disengaging same from groove 42, thereby releasing sleeve 27 and allowing spring 21 to expand. When this occurs, the upward force exerted on piston 20 by the spring 21 is transmitted to the hydraulic liquid 26, whereby the liquid is forced through aperture 37 into the interior of the telescoping piston assembly, forcing the elements thereof upwardly and urging same to their fully-extended positions shown in FIGURES 1 and 3. The upward force exerted on the elements causes the blinker lamp 31 to rise, thereby causing the lamp to engage the cover or flap 16, raising the flap to its upstanding open position, shown in FIGURE 1, and allowing the telescoping parts to be extended to their fully-raised positions, shown in FIGURES 1 and 3.

The parts may be returned to their normally housed positions by manually pushing them down to their fully-contracted positions, shown in FIGURE 4, wherein the outwardly-biased plunger 40 of solenoid 39 snaps into locking engagement in the groove 42.

As shown in FIGURE 6, the solenoid 39 is electrically-connected in parallel with the blinker lamp 31, the parallel-connected elements 39 and 31 being, in turn, connected in series with the motor vehicle battery 45 through a manually-operated main control switch 46 which may be located on the vehicle dashboard or in any other suitable location in the vehicle. When the switch 46 is closed, the solenoid 39 and the blinker lamp 31 simultaneously become energized, the solenoid retracting its plunger 40, as above explained, whereby to allow the spring 21 to expand and to act on hydraulic liquid 26 through the piston 20 in the manner above-described, whereby the telescoping piston assembly is expanded and the parts thereof are raised to their fully-elevated positions, shown in FIGURES 1 and 3.

Thus, whe nthe vehicle operator desires to employ the emergency signal lamp assembly, he merely closes the switch 46, causing operation of the assembly, as above-described. The lamp 31 is thus supported in an elevated, highly conspicuous position and provides a blinking signal which notifies other motorists, police officials, and other persons of the emergency condition of the vehicle.

As above-mentioned, the blinker lamp 31 is of a conventional type including a lamp filament and suitable thermostatically-operated blinker switch 60 which opens and closes periodically responsive to energization of the unit, thereby providing periodic on-and-off conditions of the lamp filament.

The filler plug 25 is located in a position so that it is relatively easily accessible through the aperture 15 for refilling the cylindrical housing 14 for replenishing the liquid 26 in the cylindrical housing 14 whenever necessary.

What is claimed is:
1. In a motor vehicle, a signal light assembly comprising a substantially vertical housing having a lower cylinder portion, means to mount said housing in the motor vehicle body with the top of the housing substantially flush with the body, said lower cylinder portion having a bottom wall and having a centrally-apertured top wall, a piston slidably and sealingly-mounted in said cylinder portion, a normally compressed coiled spring mounted between said piston and said bottom wall, exerting upward biasing force on the piston, hydraulic liquid substantially filling the space in said lower cylinder portion between said piston and said top wall, a main sleeve member rigidly-secured to said piston and extending slidably and sealingly through the central aperture of said top wall, said main sleeve member having an aperture in its lower portion to allow hydraulic liquid to freely enter therein, extensible telescopic post means slidably and sealingly-disposed in said main sleeve member and being extensible upwardly above the vehicle body responsive to hydraulic pressure exerted therein, signal lamp means mounted on the top of said post means, a solenoid mounted in said housing above said top wall and having a retractable plunger normally lockingly-engageable with said main sleeve member to prevent upward extension thereof, and means to at times energize said solenoid to retract said plunger and release the main sleeve member and to allow said spring to expand, whereby said piston develops pressure in said hydraulic liquid to thereby elevate said telescopic post means and said signal lamp means above said vehicle body.

2. The signal light assembly of claim 1, and wherein said expansible post means comprises at least one intermediate sleeve member and a central rod element coaxial with said main sleeve member, said signal lamp means being mounted on the top end of said rod element.

3. The signal light assembly of claim 2, and a source of current and circuit means including a control switch connecting said solenoid and signal lamp means to said source of current so as to simultaneously energize said signal lamp means and said solenoid responsive to closure of said control switch.

4. The signal light assembly of claim 3, and wherein said signal lamp means and said solenoid are connected in parallel.

5. The signal light assembly of claim 4, and wherein said signal lamp means comprises a blinker lamp unit.

6. The signal light assembly of claim 5, and wherein said main sleeve member is provided with a peripheral locking groove at its upper end, said retractable plunger normally lockingly-engaging in said locking groove.

7. The signal light assembly of claim 6, and wherein said solenoid is mounted horizontally on said top wall of the cylinder portion.

8. The signal light assembly of claim 7, and wherein said housing is provided at its top end with a hinged cover normally closing the top of said housing but being opened upwardly by said blinker lamp unit as it rises responsive to the release of the main sleeve member.

References Cited
UNITED STATES PATENTS

| | | | |
|---|---|---|---|
| 2,646,504 | 7/1953 | Gosline | 343—902 X |
| 3,143,722 | 8/1964 | Murch | 340—136 X |
| 3,145,056 | 8/1964 | Blahnik | 185—37 X |

JOHN W. CALDWELL, *Primary Examiner.*

MICHAEL SLOBASKY, *Assistant Examiner.*

U.S. Cl. X.R.

240—8.1; 340—119, 136